United States Patent
Bouesnard et al.

(10) Patent No.: US 9,458,058 B2
(45) Date of Patent: Oct. 4, 2016

(54) METHOD FOR MANUFACTURING INSULATING GLAZING

(71) Applicant: AGC Glass Europe, Louvain-la-Neuve (BE)

(72) Inventors: Olivier Bouesnard, Louvain-la-Neuve (BE); Francois Closset, Louvain-la-Neuve (BE)

(73) Assignee: AGC GLASS EUROPE, Louvain-la-Neuve (BE)

(*) Notice: Subject to any disclaimer, the term of this patent is extended or adjusted under 35 U.S.C. 154(b) by 0 days.

(21) Appl. No.: 14/294,377

(22) Filed: Jun. 3, 2014

(65) Prior Publication Data

US 2015/0020466 A1   Jan. 22, 2015

Related U.S. Application Data

(63) Continuation of application No. 13/505,649, filed as application No. PCT/EP2010/067633 on Nov. 17, 2010, now Pat. No. 8,857,698.

(30) Foreign Application Priority Data

Nov. 18, 2009  (BE) .................................. 2009/0707
Feb. 1, 2010   (BE) .................................. 2010/0050

(51) Int. Cl.
  *B23K 31/02*   (2006.01)
  *B23K 5/12*    (2006.01)
  (Continued)

(52) U.S. Cl.
  CPC .............. *C03C 27/10* (2013.01); *B23K 31/02* (2013.01); *C03C 27/046* (2013.01); *C03C 27/08* (2013.01); *C23C 4/01* (2016.01); *E06B 3/673* (2013.01); *E06B 3/67334* (2013.01)

(58) Field of Classification Search
  CPC ....... C03C 27/08; C03C 27/10; C03C 17/09; C03C 17/10; C03C 17/3615; C03C 17/3642; C03C 17/3652; C03C 17/3681; C03C 27/06; B23K 1/015; B23K 31/02; B23K 35/004; B23K 5/12
  USPC .............. 228/244, 256, 121, 124.6; 427/446, 427/165, 287, 421.1; 156/109, 107
  See application file for complete search history.

(56) References Cited

U.S. PATENT DOCUMENTS 2,147,367 A   2/1939   George
2,220,690 A   11/1940  Stupakoff
(Continued)

FOREIGN PATENT DOCUMENTS

DE   102005038453 A1   2/2007
JP     2003326606 A  *  11/2003

OTHER PUBLICATIONS

JP 2003326606 A computer english translation.*
(Continued)

*Primary Examiner* — Erin Saad
(74) *Attorney, Agent, or Firm* — Oblon, McClelland, Maier & Neustadt, L.L.P

(57) ABSTRACT

The Present invention relates to a method for manufacturing at least one portion of a seal ensuring gas-tightness between at least one first and one second glass panel in a glazing system, the method including the following steps: depositing a first adhesive layer on a first peripheral area of the first panel and a second adhesive layer on a second peripheral area of the second panel; welding a first metal seal element to the first adhesive layer; welding a second metal seal element or said first metal seal element to the second adhesive layer. According to the invention, the first and second adhesive layers are deposited using a high speed oxy-fuel flame-spraying method.

22 Claims, 6 Drawing Sheets

(51) Int. Cl.
  *C23C 4/12*   (2016.01)
  *C23C 4/00*   (2016.01)
  *C03C 27/10*  (2006.01)
  *C03C 27/04*  (2006.01)
  *E06B 3/673*  (2006.01)
  *C03C 27/08*  (2006.01)

(56) References Cited

U.S. PATENT DOCUMENTS

| | | |
|---|---|---|
| 2,756,467 A | 7/1956 | Birtus |
| 2,922,391 A * | 1/1960 | Olson et al. .................. 118/706 |
| 4,506,125 A | 3/1985 | Smets et al. |
| 5,009,218 A | 4/1991 | Bachli |
| 5,151,308 A | 9/1992 | Moskowitz et al. |
| 5,227,206 A | 7/1993 | Bachli |
| 5,648,699 A | 7/1997 | Jin et al. |
| 8,857,698 B2 * | 10/2014 | Bouesnard et al. .......... 228/120 |
| 2001/0001042 A1 | 5/2001 | Sinatra et al. |
| 2008/0124479 A1 | 5/2008 | Hazel et al. |

OTHER PUBLICATIONS http://www.ellisonsurfacetech.com/pages/hvof.htm Nov. 21, 2008 (using https://web.archive.org).*
International Search Report issued on Apr. 19, 2011 in PCT/EP10/067633 filed on Nov. 17, 2010.
English computer translation of DE 1020005038453 A1.

* cited by examiner

METHOD FOR MANUFACTURING INSULATING GLAZING

This application is a continuation of U.S. Ser. No. 13/505,649 filed May 2, 2012, issued as U.S. Pat. No. 8,857,698, which is a 371 application of PCT/EP10/067633 filed Nov. 17, 2010, and claims the benefit of Belgium Application No. 2010/0050 filed Feb. 1, 2010 and Belgium Application No. 2009/0707 filed Nov. 18, 2009. The contents of each of these applications are incorporated herein by reference in their entirety.

TECHNICAL DOMAIN OF THE INVENTION

The present invention relates to a process for manufacturing thermally insulating glazing such as vacuum glazing. The present invention also relates to the glazing thus obtained.

BACKGROUND OF THE INVENTION

In general, vacuum glazing is composed of a minimum of two glass panels separated by a void space with a thickness in the range of between 100 μm and 800 μm. Sealing is obtained by a peripheral seal. To achieve super-insulation performances (coefficient of surface transmission U<0.6 w/m$^2$K), the vacuum level between the glass panels must be in the order of $10^{-3}$ mbar or less, and generally at least one of the two glass panels must be covered by a low-emissivity layer having an emissivity of ideally less than 0.05.

Different seal technologies exist and each has some disadvantages. A first type of seal (the most widespread) is a seal based on a welding glass, the melting temperature of which is lower than that of the glass of the glazing panels. The use of this type of seal limits the choice of low-emissivity layers to those that are not impaired by the thermal cycle necessary for usage of the welding glass, i.e. to that which is resistant to a temperature that can be up to 350° C. Moreover, since this type of seal based on welding glass has very low deformability, it does not allow absorption of the effects of differential expansions between the glass panel of the glazing on the internal side and the glass panel of the glazing on the external side when these are subjected to substantial differences in temperature (e.g. 40° C.). Quite significant stresses are thus generated on the periphery of the glazing and can cause breakages of the glass panels of the glazing.

A second type of seal comprises a metal seal, e.g. a metal strip with a low thickness (<500 μm) welded around the periphery of the glazing by means of an attachment sub-layer covered at least partially with a layer of a solderable material such as a tin alloy soft solder. A significant advantage of this second type of seal over the first type of seal is that it can be deformed to absorb the differential expansions created between the two glass panels. There exist different types of attachment sub-layers on the glass panel.

Patent application (WO2006/121954) proposes a first exemplary embodiment of a seal of the second type for vacuum glazing. According to this example, the adhesion layer is deposited onto the first glass panel using different processes (physical vapour deposition (PVD), chemical vapour deposition (CVD) and cold spraying). The greatest disadvantage of CVD or PVD deposits is that they are relatively costly and complicated to implement.

For its part, deposition by cold spraying is also costly and complicated to implement and can, moreover, damage the glass substrate, on which it is conducted. In fact, such a deposit can cause cracks on the glass substrate that lead to leakages and a loss of the level of vacuum inside the glazing that does not allow a sufficiently low vacuum level (~$10^{-3}$ mbar) to be maintained for the life of the vacuum glazing (generally 10 years minimum).

US patent (U.S. Pat. No. 5,227,206; cf. column 1, lines 60-65) proposes a second exemplary embodiment of a seal of the second type for vacuum glazing. According to this example, the adhesion layer is a copper layer deposited using a low-velocity flame-spraying process. The main disadvantage of this sub-layer is its porosity (U.S. Pat. No. 5,227,206; cf. bridging paragraph of columns 1 and 2). This type of deposit does not allow adequate sealing to be obtained to maintain a sufficiently low level of vacuum (~$10^{-3}$ mbar) for the life of the vacuum glazing (generally 10 years minimum).

SUMMARY OF THE INVENTION

An aspect of the present invention proposes to use an adhesion layer deposited using the HVOF (high-velocity oxy/fuel spraying) process in a metal type seal, e.g. a metal strip, for insulating glazing (i.e. for double or triple glazing, e.g. for vacuum glazing). In fact, it has surprisingly been observed that such a deposition technique allows an adhesion layer to be obtained that has a sufficient density to guarantee a sufficient seal to maintain a sufficient level of vacuum (<$10^{-3}$ mbar) for the classic service life of vacuum glazing systems (10 years). One advantage of some embodiments of the present invention is good adhesion to the glass panel. Another advantage of some embodiments of the present invention is that the deposit is made without damaging the glass panel. Another advantage of some embodiments of the present invention is that they are conducted in a simple manner at reasonable cost (e.g. lower in cost and complexity than CVD and PCD depositions).

Another advantage of some embodiments of the present invention is that they allow higher densities to be obtained than those obtained using standard flame-spraying processes. Said densities are comparable to that of the sprayed metal. Despite the significant amount of energy supplied to the metal particles by the combination of combustion and high spraying velocity (supersonic), it has surprisingly been observed that the substrate is not damaged by the deposit (no cracking observed during optical microscope analysis).

The pressure inside the vacuum glazing is preferably lower than $10^{-3}$ mbar so that it retains its super-insulation energy-saving properties for a working period. Consequently, the acceptable pressure build-up during the life of the product is preferably in the same order of magnitude at maximum. Some embodiments of the present invention allow a vacuum of less than $10^{-4}$ to $10^{-3}$ mbar to be retained in the interior of a glazing for 10 years.

In a first aspect, the present invention relates to a process for manufacturing at least one portion of a seal ensuring gas-tightness between at least one first and one second glass panel in a glazing, wherein the process comprises the following steps:

depositing a first adhesion layer onto a first peripheral zone of the first panel and a second adhesion layer onto a second peripheral zone of the second panel;

welding a first metal seal element to the first adhesion layer; and welding a second metal seal element or said first metal seal element to the second adhesion layer;

in which the first and second adhesion layers are deposited using an HVOF process (high-velocity oxy/fuel flame-spraying).

In the case of a vacuum glazing, the vacuum can be formed in the sealed cavity delimited by the seal, for example, by means of a suitable suction system connected to the cavity.

In the embodiments of the manufacturing process according to the invention the process can additionally include a step of depositing a metal solder layer onto at least one portion of at least one of the adhesion layers. In the embodiments of the manufacturing process according to the invention, at least one of the welds of the seal element is a fusion weld of said metal solder layer. The presence of a metal solder layer facilitates the welding.

In the embodiments of said manufacturing process according to the invention, at least one of said welding steps can be an ultrasonic or induction welding operation. Ultrasonic welding has the advantage of not necessarily requiring a metal solder layer.

In the embodiments of said manufacturing process according to the invention, one of said glass panels can be provided with a thermal insulation layer. This can render the glazing even more highly insulating.

In the embodiments of said manufacturing process according to the invention, the glazing can be a vacuum glazing. This can render the glazing even more highly insulating ($U<0.6$ W/m$^2$K).

In the embodiments of said manufacturing process according to the invention, a first metal seal element can be welded to the first adhesion layer and a second metal seal element can be welded to the second adhesion layer, the manufacturing process can additionally include the welding of the first seal element to the second seal element. This enables the welding steps of the first and of the second seal element to be conducted in an atmosphere of atmospheric pressure. Only the last step of welding the seal elements together must then be conducted in a vacuum in order to obtain a vacuum glazing.

In the embodiments of said manufacturing process according to the invention, the said peripheral zones can be heated to a temperature of 150° C. or more, preferably 200° C. or more, more preferred 250° C. or more, before said adhesion layers are deposited. This enables the adhesion of the adhesion layer to the glass panel to be improved.

In the embodiments of said manufacturing process according to the invention, the said adhesion layers can have a thickness of 1 to 100 μm, preferably 1 to 30 μm, more preferred 5 to 15 μm. Such thicknesses prevent the layer from peeling while allowing sufficient thickness to enable the layer to perform its functions.

Advantageously, said adhesion layers can have a roughness Ra of 1 to 5 μm, preferably 2 to 3 μm. This allows good adhesion of the metal solder layer to the adhesion layer.

Advantageously, at least one of the adhesion layers can be exposed to a carburising flame before undergoing said welding. As a result of this, oxide creation can be reduced and thus the wettability of the deposit can be improved for subsequent operations.

Advantageously, said adhesion layers can be formed from an adhesive material selected from the group consisting of copper and its alloys, aluminium and its alloys, iron and its alloys, platinum and its alloys, nickel and its alloys, gold and its alloys, silver and its alloys, titanium and its alloys and tin or its alloys.

In a configuration according to the invention said adhesion layers can be formed from an adhesive material that has a coefficient of thermal expansion of 3 to $23.10^{-6}$ K$^{-1}$, preferably 4 to $18.10^{-6}$ K$^{-1}$, more preferred 5 to $16.10^{-6}$ K$^{-1}$. Problems of differential expansion between the glass panel and the adhesive material can be prevented as a result of this.

Advantageously, the manufacturing process can additionally include a step of exposing at least one of said adhesion layers to a soldering flux before said welding and/or before said deposition of a metal solder layer. This enables the oxides present on the surface to be dissolved. For example, in the case of an adhesion layer made of copper, the flux used can be a flux supplied by Castolin under the reference 157NC.

Advantageously, the manufacturing process can additionally include a step of cleaning the surplus soldering flux after said welding and/or after said deposition of a metal solder layer. This prevents the seal from deteriorating and restricts degassing after placing under vacuum.

Advantageously, at least one of said metal seal elements can have a metal weld layer that pre-exists this welding to one of said adhesion layers. This facilitates soldering.

In the embodiments of the manufacturing process according to the invention, the following steps can be implemented:

depositing a first adhesion layer onto a first peripheral zone of the first panel and a second adhesion layer onto a second peripheral zone of the second panel in an atmosphere at atmospheric pressure;

welding a first metal seal element to the first adhesion layer in an atmosphere at atmospheric pressure;

welding a second metal seal element distinct from the first metal seal element to the second adhesion layer in an atmosphere at atmospheric pressure; and welding the first metal seal element to the second metal seal element in an atmosphere at reduced pressure and preferably under vacuum.

This is economically advantageous compared to a process that is conducted entirely under vacuum.

Advantageously, said metal seal elements can contain at least one material selected from copper and its alloys, aluminium and its alloys, iron and its alloys.

In the embodiments of said manufacturing process, said metal seal elements and/or the adhesive material can be made of an iron alloy containing the following metals: iron (53-55% wt., e.g. 53.5% wt.), nickel (28-30% wt., e.g. 29% wt.) and cobalt (16-18% wt., e.g. 17% wt.) such as Kovar®. This is advantageous because this type of alloy has a coefficient of thermal expansion close to that of glass.

In other embodiments of said manufacturing process, said metal seal elements and/or the adhesive material can be made of an iron alloy containing the following metals: iron (50-55% wt., e.g. 52% wt.), nickel (45-50% wt., e.g. 48% wt.) such as alloy 48. This is advantageous because this type of alloy has a coefficient of thermal expansion close to that of glass.

Advantageously, the thickness of the seal elements is in the range of between 50 μm and 1000 μm; preferably between 100 μm and 500 μm; preferably between 150 μm and 300 μm. A thickness of 200 μm, for example, can be used.

Advantageously, said high-velocity oxy-fuel flame-spraying process can include the following steps:

in a spraying assembly comprising first, second and third inlets, each leading to a combustion chamber, and one outlet, injecting under pressure a fuel (e.g. kerosene or propylene) and oxygen through said first inlet;

injecting the adhesive material into said second inlet;

conducting a combustion (ignition of the combustion can be achieved automatically or manually with a spark or a flame) between said fuel and said oxygen to melt the adhesive material in the combustion chamber;

injecting a gas under pressure (e.g. compressed air, argon . . . ) through said third inlet to enable spraying of said molten adhesive material from said assembly via said outlet at a supersonic speed; and orienting the outlet of said assembly towards one of said peripheral zones to thus enable one of said adhesion layers to be formed.

Advantageously, the angle between the axis of said outlet and said glass panel can be 45° to 90°, preferably 70° to 90°, more preferred 75° to 90° and further preferred 80° to 90°.

For example, an angle of 90° allows a denser deposit to be obtained, whereas with an angle of 45° the deposit will be rougher (and the shading will also be more effective).

In the embodiments of the invention the distance measured in the extension of the axis of said outlet between said outlet and the glass panel can be 10 to 30 cm, preferably 15 to 25 cm, more preferred 17 to 23 cm.

Hence, it is advantageous to provide a sufficient distance to prevent too much energy being supplied to the glass (which could cause it to break and lead to over-oxidation of the deposit) and to obtain a sufficiently wide metallised zone.

In the embodiments of the invention, said assembly and the glass panel can be moved relative to one another during formation of said adhesion layers at a speed of 5 to 30 m/min, preferably at a speed of 5 to 20 m/min, more preferred at a seed of 5 to 15 m/min and further preferred 7 to 13 m/min.

Thus, such speeds are compatible with a glass transport and enable a favourable thickness of the adhesion layer to be maintained.

Advantageously, the pressure of the oxygen can be from 4 to 10 bar, preferably from 5 to 9 bar, more preferred from 6 to 8 bar.

Thus, such pressures enable the combustion mixtures to be configured correctly and the supersonic speeds to be reached.

Advantageously, said fuel can be selected from the group formed from methane, ethane, propane, butane, natural gas, propylene, hydrogen, kerosene or acetylene.

Advantageously, said fuel can be propylene.

Advantageously, the pressure of said fuel can be from 2 to 10 bar, preferably from 3 to 8 bar, more preferred from 4 to 6 bar.

Advantageously said compressed air can be injected at a pressure of 2 to 10 bar, preferably 3 to 9 bar, more preferred 4 to 8 bar and further preferred 5 to 7 bar.

Advantageously, the adhesive material can be injected in a carrier gas and the pressure of said carrier gas is 2 to 8 bar, preferably 2 to 6 bar and more preferred 3 to 5 bar.

Another aspect of the present invention relates to a glazing system that can be obtained by any embodiment of the manufacturing process according to the present invention.

A further aspect of the present invention relates to a glass panel that can be obtained by depositing an adhesion layer onto a peripheral zone, in which said deposition is conducted with a high-velocity oxy-fuel flame-spraying process, wherein said deposition is such as described in any of the embodiments of the manufacturing process according to the present invention.

DESCRIPTION OF THE INVENTION

Figure 1:
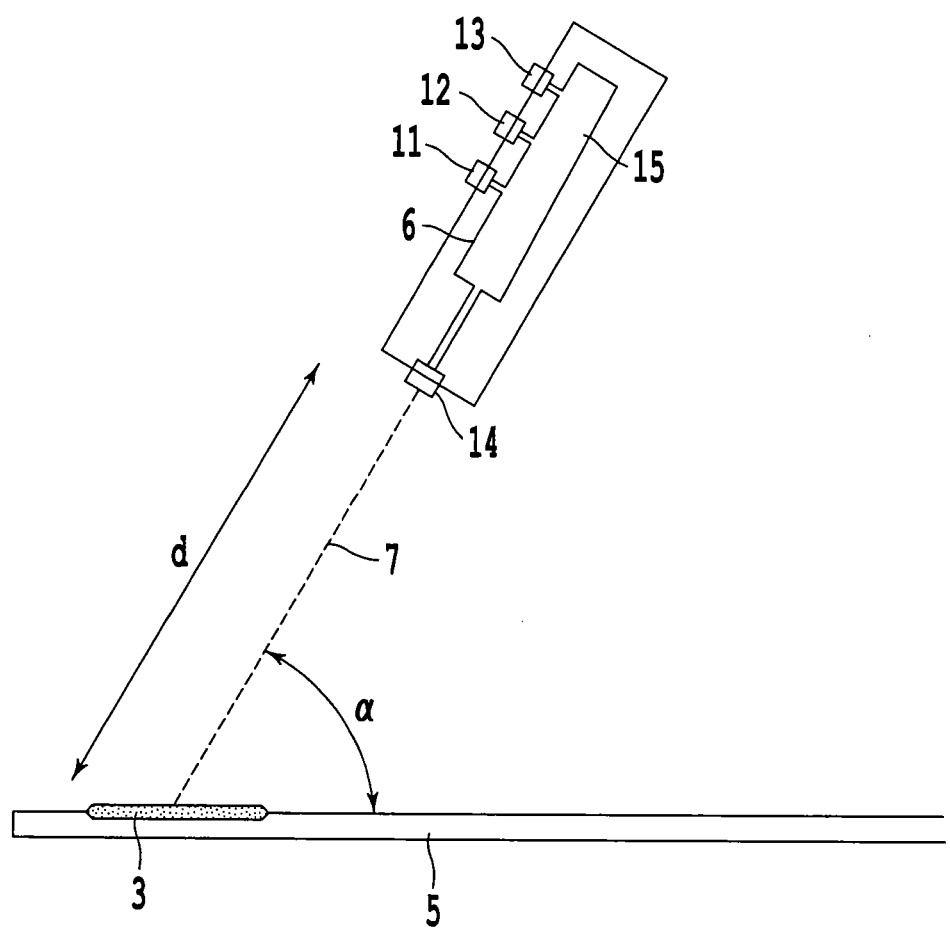
FIG. 1 shows diagram illustrating the high-velocity oxy-fuel flame-spraying step according to an embodiment of the present invention.

The present invention will be described with reference to particular embodiments and by referring to some drawings, but the invention is not restricted by this and is only restricted by the claims. In the drawings the size and relative dimensions of some elements may be exaggerated and are not drawn to scale for reasons of clarity.

Moreover, the terms first, second, third and the like in the description and in the claims are used to distinguish between similar elements and not necessarily to describe a sequence, whether in time or space, for the purposes of classification or the like. It is clearly understood that the terms thus used are interchangeable in appropriate circumstances and that the embodiments of the invention described here can be implemented in other sequences than those described or illustrated here.

Moreover, the terms high, low, above, below or the like in the description and in the claims are used for descriptive purposes and not necessarily to describe relative positions. It is clearly understood that the terms thus used are interchangeable in appropriate circumstances and that the embodiments of the invention described here can be implemented in other orientations than those described or illustrated here.

It should be noted that the term "comprising" used in the claims must not be interpreted as being restricted to the items listed thereafter. It does not exclude other elements or steps. It must therefore be interpreted as specifying the presence of the specified elements, entities, steps or components referred to, but does not exclude the presence or addition of an element, entity, step or component or group thereof. Therefore, the range of the expression "an assembly comprising means A and B" must not be restricted to assemblies consisting only of components A and B. This means, as far as the invention is concerned, the only relevant components of the assembly are A and B.

As used here and unless indicated otherwise, "at least one portion" is understood to mean that if the first and the second seal elements are not one and the same seal element, the process results in an intermediary, i.e. a seal part that will only perform its seal function after said first and second seal elements of said seal are welded together.

As used here and unless indicated otherwise, "gas-tightness" is understood to mean tightness to any gas that could be used in a double glazing unit to improve insulation (for example, argon) or tightness to air or any other gas present in the atmosphere (in the case of a vacuum glazing).

As used here and unless indicated otherwise, "thermal insulation layer" is understood to be a metal oxide layer with an emissivity of less than 0.2, preferably less than 0.1 and more preferred less than 0.05. One of the adhesion layers can be deposited onto a thermal insulation layer (preferably deposited onto the glass panels) that can be one of the following layers, for example: planibel G, planibel top N and top NT supplied by AGC.

As used here and unless indicated otherwise, the term "carburising flame" relates to a flame obtained when there is not sufficient oxygen to burn (i.e. to break the entire molecule and oxidise all its hydrogen and its carbon) all the fuel (e.g. propylene or any other fuel).

As used here and unless indicated otherwise, the term "spacer" relates to one or more elements that ensure a relatively constant distance between two adjacent glass panels.

The HVOF process is a technique of thermal spraying in which a substrate is covered by a sprayed material (here an adhesive material) by a spraying assembly. One of the special features of this method of spraying is the relatively high speed of the sprayed particles. The spraying assembly is generally referred to as "spray gun".

The energy necessary for fusion and for part in the acceleration of the particles of said adhesive material (since the gas injected under pressure also participates in the acceleration) is obtained during combustion of a fuel by oxygen. Examples of suitable fuel are methane, ethane, propane, butane, natural gas, propylene, hydrogen, kerosene or acetylene amongst others. Propylene is preferably used.

In an embodiment of the present invention the fuel and the oxygen are both injected into the spraying assembly under high pressure. Moreover, the flame is accelerated by a supply of compressed gas (argon, air . . . ) and directed into an injection nozzle forming part of the spraying assembly to reach a supersonic speed at the nozzle outlet. The powder of the adhesive material is itself injected axially into the spraying assembly.

The layers produced by this type of process are very dense and resistant.

In an embodiment of the present invention the peripheral zone of the glass panel where the adhesion layer is deposited can be firstly preheated to a temperature higher than 150° C., preferably higher than 200° C. and more preferred higher than 250° C. The use of preheating improves adhesion to the glass panel. The preheating can be conducted by any method known to a person skilled in the art such as, for example, by means of a flame or infrared lamp.

The adhesion layer is deposited onto the periphery of each of the glass panels over an area with a width of several millimeters, e.g. between 1 and 15 mm.

For deposition of the adhesion layer, for example, either the glass panel is transported below a spraying assembly one side after the other, or the spraying assembly is movable and the glass panel is fixed, or the glass panel is transported below the spraying assembly, which is itself movable.

The spraying assembly used can be an HVOF powder spraying assembly (such as that supplied by GMA under the trade name "Microjet™"). It can be equipped with one of the following nozzles supplied by AIRCAP Microjet—Metallizing Equipment CO PVT. LTD:
 the nozzle with reference HP-3-A (made of aluminium with a diameter of 8.4 mm)
 the nozzle with reference HP-3-B (made of aluminium with a diameter of 9.4 mm)
 the nozzle with reference HP-3-C (made of copper with a diameter of 9.5 mm).

For example, nozzle HP-3-C is used, which is an open and short nozzle ideal for spraying metals with a low melting point.

FIG. 1 shows a spraying assembly 6 spraying a jet 7 containing an adhesive material. The spraying is conducted over a peripheral zone of a glass panel 5, thus forming an adhesion layer 3. The jet 7 and the glass panel 5 form an angle α. The distance measured in the extension of the axis of the outlet of the spraying assembly 6 between said outlet and the glass panel is indicated by the letter d. The spraying assembly 6 may optionally further include a first inlet 11, a second inlet 12, and a third inlet 13. The first, second, and third inlets 11, 12, 13 lead to a combustion chamber 15 which has an outlet 14 for spraying the jet 7.

To obtain a functional adhesion layer for an insulating (e.g. vacuum) glazing seal, the following deposition parameters are preferably used: with respect to geometric parameters (see FIG. 1), the angle α between the axis of the outlet of the spraying assembly 6 and the glass panel 5 can be 45° to 90°, preferably 70° to 90°, more preferred 75° to 90° and ideally 80° to 90°. The distance d measured in the extension of the axis of said outlet between said outlet (the nozzle arrangement) of the spraying assembly 6 and the surface of the glass panel 5 can be 10 to 30 cm, preferably 15 to 25 cm, more preferred 17 to 23 cm and ideally around 20 cm. The relative speed between the glass panel 5 and the spraying assembly 6 can be 5 to 30 m/min, preferably 5 to 20 m/min, more preferred 5 to 15 m/min and further preferred 7 to 13 m/min, and ideally around 10 m/min.

For the flame parameters, the oxygen pressure can be 4 to 10 bar, preferably 5 to 9 bar, more preferred 6 to 8 bar and ideally around 7 bar. The preferred fuel is propylene. The pressure of the fuel is preferably 2 to 10 bar, preferably 3 to 8 bar, more preferred 4 to 6 bar and ideally around 5 bar. The compressed air can be injected at a pressure between 2 and 10 bar, preferably 3 to 9 bar, more preferred 4 to 8 bar and most preferred 5 to 7 bar and ideally around 6 bar. The powder is injected with a carrier gas (e.g. argon); the pressure thereof can be, for example, between 2 and 8 bar, preferably 2 to 6 bar, more preferred 3 to 5 bar and ideally around 4 bar.

The average thickness of the adhesion layers 3 deposited is preferably 1 to 100 μm, preferably 1 to 30 μm, more preferred 5 to 15 μm.

Figure 5:
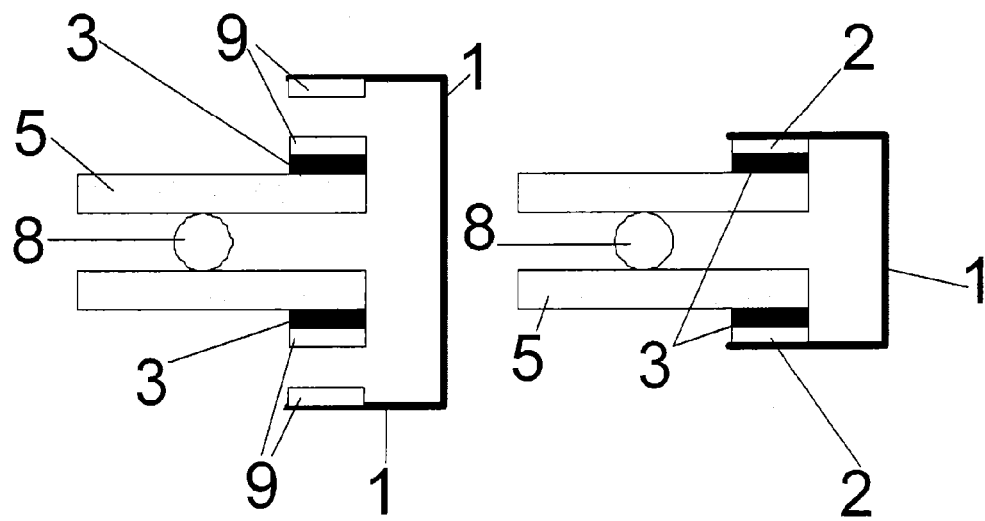
FIG. 5 illustrates a process for manufacturing a seal according to an embodiment of the present invention.

Ideally, the average thickness lies between 5 and 15 μm (measurements conducted by a profilometer supplied by Veeco under the trade name "DekTak® 6M"). If the deposits 3 are too thick, the layer 3 can peel at the instant of deposition. Another parameter of the deposited adhesion layer 3 is its roughness. Its roughness is preferably such as to allow good adhesion of the optional tinning layer 9 (see FIG. 5). The obtained roughness (Ra) measured by a roughness meter such as Talysurf™ preferably lies between 1 and 5 μm, it is ideally in the order of 2 to 3 μm.

The roughness Ra is defined here as being the average spacing or arithmetic mean of the distances between successive peaks and troughs of the surface.

As a result of an optional passage under a carburising flame directly after the adhesion layer is deposited, the creation of too much oxide can be prevented and the wettability of the deposit can thus be improved for subsequent operations.

Different metals can be sprayed onto the glass panel: for example, the adhesive material can be selected from the group consisting of copper and its alloys (e.g. with titanium and/or chromium), aluminium and its alloys, iron and its alloys (such as Fe—Ni alloys: e.g. iron (50-55% wt., e.g. 52% wt.), nickel (45-50% e.g. 48% wt.) such as alloy 48), iron alloys containing the following metals: iron (53-55% wt., e.g. 53.5% wt.), nickel (28-30% wt., e.g. 29% wt.) and cobalt (16-18% wt., e.g. 17% wt.) and Kovar®, platinum and its alloys, nickel and its alloys, gold and its alloys, silver and its alloys, gallium arsenide and tin or its alloys. This list is not exhaustive.

This adhesion layer preferably attaches well to the glass panel. This adhesion layer is ideally sufficiently flexible to absorb differential expansions in relation to the substrate (glass panel). A material with a coefficient of thermal expansion (CTE) that is essentially similar to that of the glass panel (around $9.10^{-6}$ $K^{-1}$) can be used to prevent this type of stress. For example, a coefficient of thermal expansion of 3 to $23.10^{-6}$ $K^{-1}$ is advantageous, preferably 4 to $18.10^{-6}$ $K^{-1}$, more preferred 5 to $16.10^{-6}$ $K^{-1}$. Kovar® is a particularly advantageous material because of its thermal expansion of around $5.10^{-6}$ $K^{-1}$. Copper, which can also be used, has a thermal expansion of $16.10^{-6}$ $K^{-1}$.

Kovar® is an alloy containing iron (53.5% wt.), nickel (29% wt.), cobalt (17% wt.), manganese (0.3% wt.) and silicon (0.2% wt.). An advantageous material is an iron alloy containing the following metals: iron (53-55% wt. e.g. 53.5% wt.), nickel (28-30% e.g. 29% wt.) and cobalt (16-18% e.g. 17% wt.).

Various methods can be used to weld the metal seal element to the adhesion layer deposited by HVOF. One possibility is to use a layer of metal solder (e.g. for low-temperature soldering). The adhesion layer is covered by a layer of metal solder. This step is known as tinning. The layer of metal solder can be deposited by curtain deposition, by a flame-spraying process, by HVOF, by soldering iron or by electroplating, and this list is not exhaustive. To wet the adhesion layer it is sometimes advantageous to apply a soldering flux to dissolve the oxides present on the surface of the layer (by spraying or other method). A soldering flux is a mixture of chemical products that enable a good wetting to be assured eliminating the oxides of the layer, protecting the adhesion layer from oxidation and lowering the surface tension of the layer. Soldering flux is available in liquid, paste, gaseous or solid forms. The soldering flux is preferably liquid. It is preferably matched to the nature of the adhesive material deposited onto the glass. The person skilled in the art knows which soldering flux is matched to which material.

In some embodiments of the present invention the layer of metal solder can have a thickness ranging from few microns to several hundreds of microns. The standard alloys for low-temperature soldering (<300° C.) are tin alloys (tin-silver, tin-copper, tin-silver-copper, tin-lead, tin-aluminium, amongst others).

After tinning, the surplus quantities of flux are preferably cleaned away (e.g. by washing with water) to prevent deterioration of the seal and restrict degassing after placing under vacuum. The metal seal element is then soldered to the adhesion layer. The soldering can be conducted by local heating with a soldering iron with or without supplying material. The thermal load (temperature and contact time) experienced by the sub-layer is preferably restricted to prevent damage (separation).

Another possibility is to use an induction soldering operation that has the advantage of being conducted without contact with a hot part and in a uniform manner. This reduces the risk of the adhesion layer deteriorating. Other methods of local heating can also be used for soldering: infrared local heating, hot air, laser and microwave soldering, amongst others. Ultrasonic soldering can also be used. In this case, the first and second solder layers can be omitted. The seal element can be placed in direct contact respectively with the first and second adhesion layers. High-frequency vibrations are transmitted to the seal element and the adhesion layer by means of a vibrating tool called a sonotrode or welding head. Welding is conducted by the heat generated at the interface of the two parts.

With the different methods of welding it is preferable if the tinning is placed in close contact with the metal seal element. This can be achieved by means of a sufficient pressure, which thus assures the continuity of the seal.

To facilitate the soldering, the seal element can be pre-coated with a metal solder layer with a thickness ranging from few microns to a hundred microns or even more (of identical material or not to the metal solder deposited on the adhesion layer).

In the case of ultrasonic welding, the junction between the adhesion layer and the metal seal element can also be made without any tinning layer.

The process of welding the metal seal element can be conducted in one or more steps.

In the option of welding in one step, the seal element that allows vacuum sealing is configured in a single piece and is soldered to different respective adhesion layers of different glass panels (e.g. to two respective adhesion layers of two glass panels).

Figure 2:
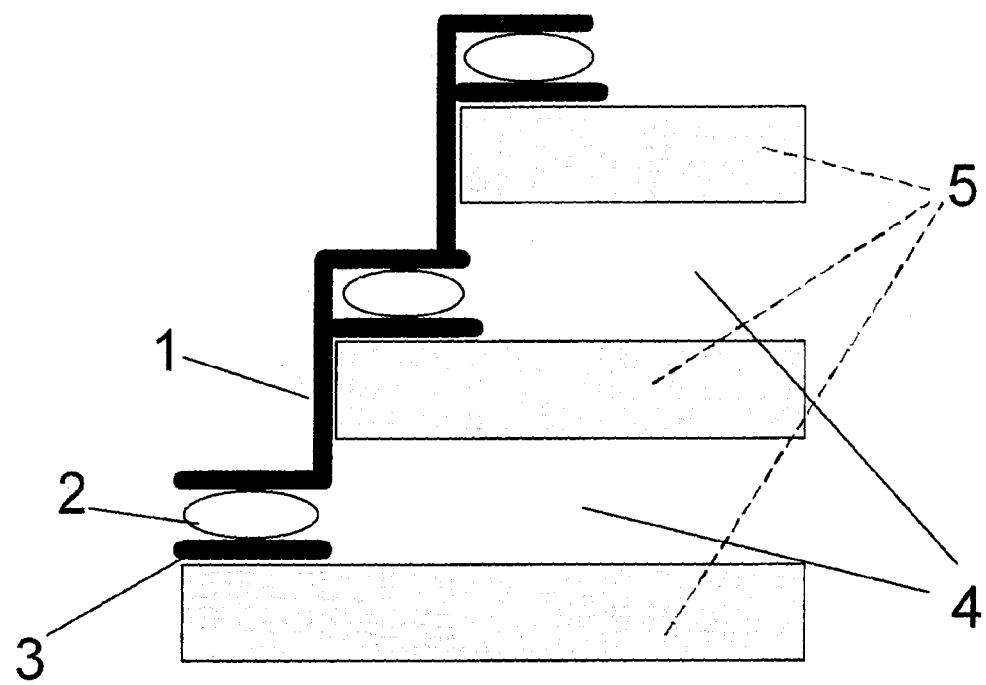
FIG. 2 shows a diagram illustrating a triple glazing obtained by an embodiment of a process according to the present invention.
Figure 3:
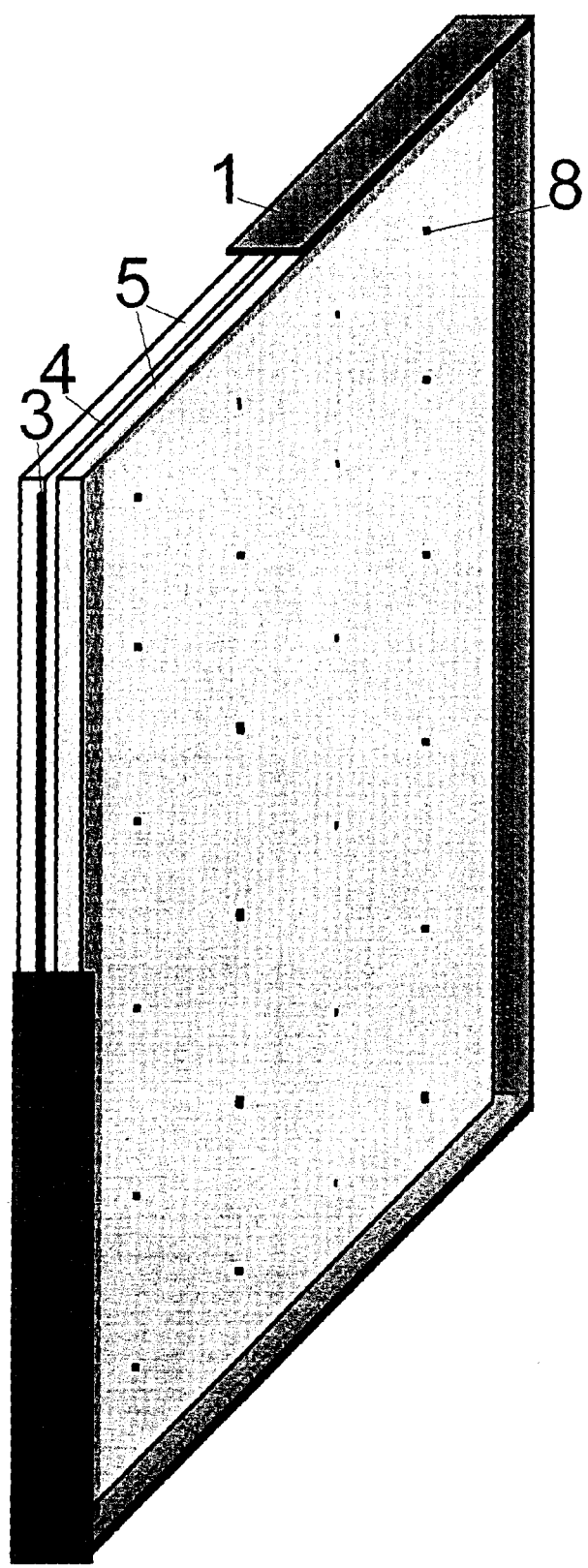
FIG. 3 is a perspective view of a double glazing obtained by an embodiment of a process according to the present invention.
Figure 4:
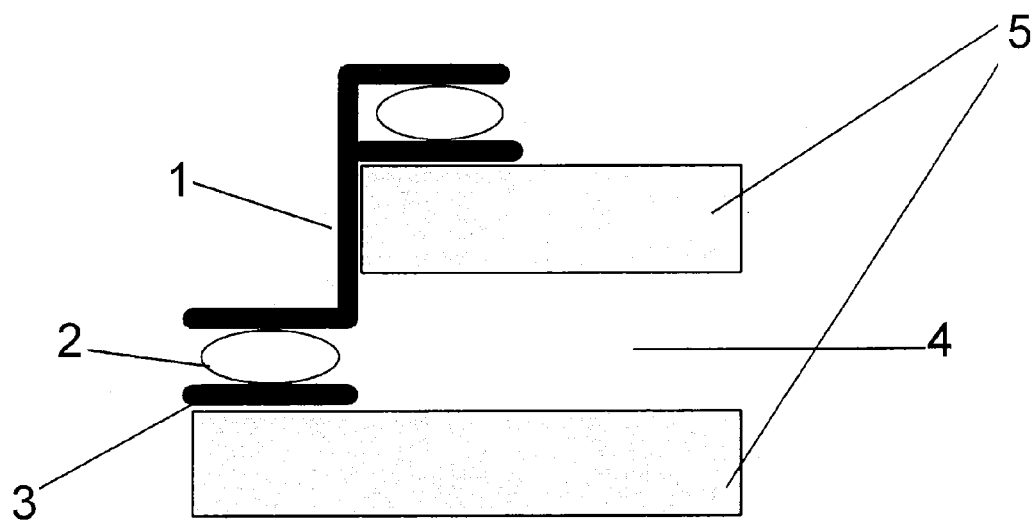
FIG. 4 shows a diagram illustrating a double glazing obtained by an embodiment of a process according to the present invention.

FIGS. 3 and 4 show a vacuum glazing comprising two glass panels 5, each covered by an adhesion layer 3 over a peripheral zone. The two panels are assembled to be gastight (assuring the vacuum 4 here) by means of a seal composed of a single metal strip 1 welded to the adhesion layers 3 by welds 2. FIG. 2 also shows spacers 8 that maintain a constant distance between the two glass panels 5.

Figure 8:
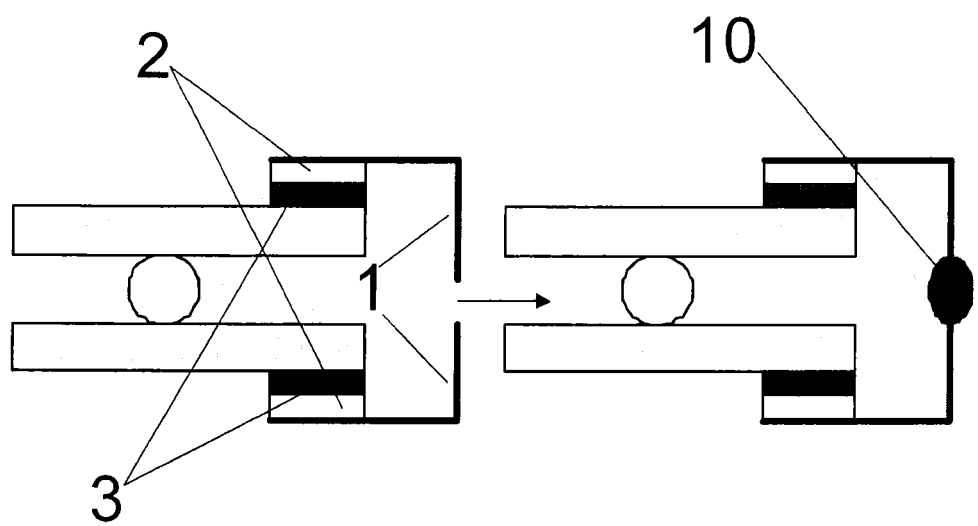
FIG. 8 illustrates an embodiment of a process for manufacturing a seal according to the present invention.

In the option of welding in several steps (see FIG. 8), the strip system is composed of several strips 1. A first metal strip 1 is welded to the first glass panel 5 by a weld 2. A second metal strip 1 is welded to the second glass panel 5 by another weld 2. These two separate strips 1 are then welded together by a weld 10 to form the seal using a standard welding technique, e.g. by laser. An advantage of this process in two steps can be to conduct the sealing of the vacuum glazing in an atmosphere at reduced pressure whereas the soldering of each strip is conducted beforehand at atmospheric pressure.

The seal element is preferably a metal strip. It can be formed by means of a non-metal element (e.g. a plastic material) covered with metal (which allows the heat conduction through the seal to be reduced). For example, it can be made of copper or copper alloy, aluminium or aluminium alloy, steel or steel alloy, iron or iron alloy (e.g. of an iron alloy containing the following metals: iron (53-55% wt. e.g. 53.3% wt.), nickel (28-30% wt., e.g. 29% wt.) and cobalt (16-18% wt., e.g. 17% wt.) such as Kovar® or of an iron alloy containing the following metals: iron (50-55% wt., e.g. 52% wt.), nickel (45-50% wt., e.g. 48% wt.) such as alloy 48. It can also be a composite of these different materials.

In the case of a triple vacuum glazing (see FIG. 2), a first glass panel 5 is separated from a second glass panel 5 by a void space 4 and this second panel 5 is separated from a third panel 5 by a second void space 4.

Figure 6:
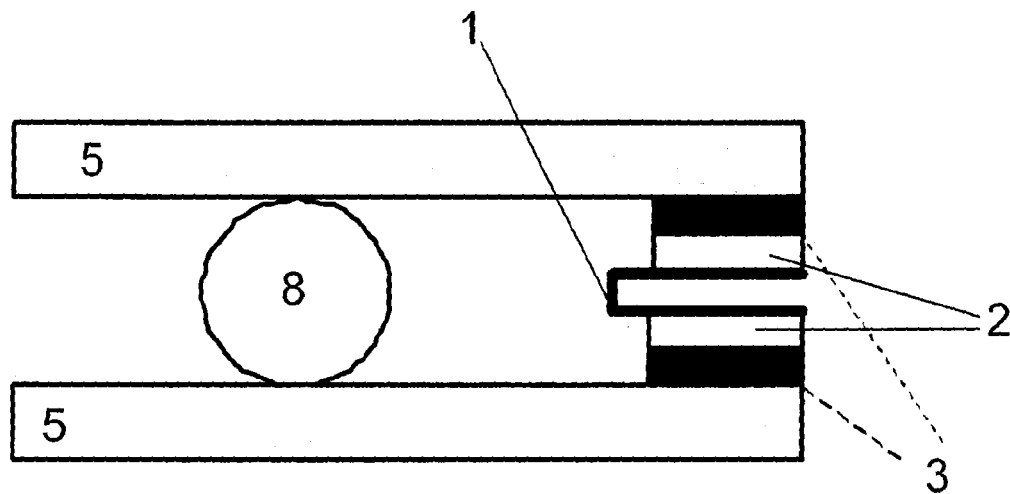
FIG. 6 shows the diagram of a glazing obtained according to an embodiment of a process for manufacturing a seal according to the present invention.
Figure 7:
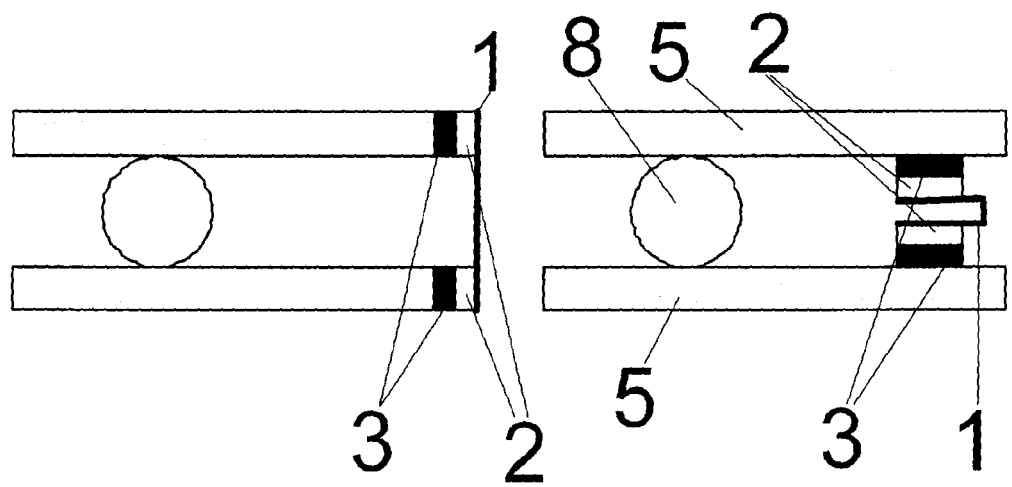
FIG. 7 shows diagrams of two glazing units obtained according to two embodiments of a process for manufacturing a seal according to the present invention.

A first adhesion layer 3 is deposited onto a first peripheral zone of the first panel 5, a second adhesion layer 3 is deposited onto a second peripheral zone of the second panel 5 and a third adhesion layer 3 is deposited onto a third peripheral zone of the third panel 5. A first option is to use a single metal strip 1 welded to each of the adhesion sub-layers by means of a weld 2. A second option (not illustrated in FIG. 2) is to weld a first strip to the first adhesion layer of the first panel, a second strip to the second adhesion layer of the second panel and a third strip to the third adhesion layer of the third panel. In an atmosphere at reduced pressure (e.g. under vacuum such as a vacuum of $10^{-3}$ bar or a higher vacuum), the first strip is then welded to the second strip to create a void space between the first and the second glass panel. The second strip is welded to the third strip to create the void between the second and the third panel. In general, there are several methods for forming a seal according to the invention. In any of the embodiments described above any glass panel can be fitted with an adhesion layer located on an edge area containing the end of the glass panel (situation in FIGS. 2-6 and 8), located on the edge of a glass panel (situation in FIG. 7 on the left) or located close to an edge that does not contain the end of the glass panel but covers a peripheral zone of said glass panel, said zone commencing at a distance in the range of between 0 and 10 cm from said end (situation in FIG. 7 on the right). In the case of a double glazing, each adhesion layer can be deposited onto its glass panel so that it is oriented towards the interior of the glazing (see FIG. 4 bottom panel, FIG. 6 the two panels and FIG. 7 the two panels forming the glazing on the right), towards the exterior of the glazing (see FIG. 4 top panel, FIG. 5 the two panels and FIG. 8 the two panels) or on the edge of the glass panel. In the case of an external panel of a triple glazing, each adhesion layer can be deposited onto its glass panel so that it is oriented towards the interior of the glazing (see FIG. 2 bottom panel), towards the exterior of the glazing (see FIG. 2 top panel) or on the edge of the glazing (not shown in FIG. 2 but analogous to the situation in FIG. 7). In the case of an internal panel of a triple glazing, the adhesion layer can either be deposited onto the edge of the glass panel (this situation is not illustrated but is analogous to the situation in FIG. 7) or onto one of the main surfaces of the glass panel. If it is deposited onto one of the main surfaces of the glass panel, the adhesion layer can be present on either of said surfaces. In all cases, the following configurations are possible: the adhesion layers of two adjacent panels can be facing one another (situation in FIG. 6 and FIG. 7 on the right) or not be facing one another (situation in FIGS. 2, 4, 5, 7 on the left or 8). If they are not facing one another, the two adhesion layers can be oriented so that they are again located on facing surfaces (situation in FIG. 5 and FIG. 8) or one can be oriented towards the exterior of the assembly of the two glass panels and the other can be oriented towards the interior of the assembly of the two glass panels (situation in FIGS. 2 and 4). The glass panels can have the same dimensions or different dimensions. The edge of each glass panel can be at the same height as the edge of an adjacent panel (situation in FIGS. 5, 6 and 7). The edge of each glass panel can also be at a different height to the edge of an adjacent panel, i.e. be offset in relation to the position of the edge of an adjacent panel (situation in FIGS. 2 and 4). The strip system can be composed of a single strip (situation in FIGS. 2, 4, 5, 6 and 7) or of several strips joined to each other by welds during the course of the process (situation in FIG. 8). The strip system (or single strip) can be in the form of steps (situation in FIGS. 2 and 4), U-shaped (see FIGS. 5, 6 and 7 on the right) or can be level (FIG. 7 on the left). Where a thermal insulation layer is present, the adhesion layer can be deposited onto the thermal insulation layer or onto the side of the glass opposite the thermal insulation layer or on the edge of the glass panel.

EXAMPLES

The following computation is provided by way of example:

With an initial pressure of $10^{-4}$ mbar the maximum acceptable leak rate to ensure a pressure lower than $10^{-3}$ mbar in the interior of the glazing for 10 years can be evaluated as follows:

initial pressure in the interior of the glazing=$10^{-4}$ mbar.

The build-up in maximum pressure (delta P) to have a pressure lower than $10^{-3}$ mbar after 10 years is calculated by $10^{-3}$ mbar−initial pressure=$0.9 \cdot 10^{-3}$ mbar.

For a glazing of 1 m² with a spacing of 0.2 mm between the two glass panels, the volume (V) of the vacuum glazing is 1 m*1 m*$0.2 \cdot 10^{-3}$ m=$0.2 \cdot 10^{-3}$ m³, which corresponds to 0.2 liter.

Service life (D) equivalent to 10 years is equal to 3600 seconds*24 hours*365 days*10 years, which equates to 315,360,000 seconds.

Thus, the maximum leak rate=(delta P)*V/D=$5.7 \cdot 10^{-13}$ mbar·l/sec.

Two sources of pressure build-up can be observed: leaks through the seal (real leaks) or degassing of the interior surfaces of the seal of the glazing (virtual leaks).

Sealing tests using a standard helium leak detector (such as the detector supplied by Pfeiffer under the name Smart Test HLT560) were conducted by the inventors to quantify the "real" leaks through the seal. The leak rates measured in accordance with European standard EN13185 on glazing units with a sub-layer deposited by the process according to an embodiment of the present invention are below the limit detectable by this type of equipment (<$5 \cdot 10^{-10}$ mbar·l/sec).

The sealed cavity delimited by the seal of a sample produced with the seal according to the process of the invention is connected to the leak detector by means of a suitable suction system. The sample is immersed in a chamber with a helium atmosphere (atmosphere containing more than 99% helium). The sealed cavity is placed under vacuum (~$5 \cdot 10^{-3}$ mbar) by the pump of the helium detector. The helium flux detected by the detector is in the order of the background noise of the machine (<$5 \cdot 10^{-10}$ mbar·l/sec). This proves that no helium is penetrating into the cavity through the seal produced according to the described method.

Even if this level of leak rate is not sufficient to ensure a service life of the glazing of several years, it is known that when no leak of this level is detected, the seal is perfectly tight in the vast majority of cases.

The seals with a sub-layer deposited by a standard flame-spraying process exhibited numerous leaks as a result of the porosity of the deposit. The values measured with the helium detector are in the order of $10^{-6}$-$10^{-7}$ mbar·l/sec. This is completely inadequate to retain a functional vacuum level in the interior of the glazing. With this leak rate, in the case of a glazing with a surface area of 1 m² and a spacing between panels of 0.2 mm, with an initial pressure of $10^{-4}$ mbar, the pressure of $10^{-3}$ mbar is reached after only 180 seconds.

Another aspect of the present invention relates to a glazing that can be obtained by any embodiment of the manufacturing process according to the present invention.

A further aspect of the present invention relates to a glass panel that can be obtained by depositing an adhesion layer onto a peripheral zone, in which said deposit is conducted with a high-velocity oxy-fuel flame-spraying process, and said deposit is such as that described in any of the embodiments of the manufacturing process according to the present invention.

The invention claimed is:

1. A process for manufacturing at least one portion of a glazing having one first and one second glass panel, the process comprising:
   preheating a first peripheral zone of the first panel and a second peripheral zone of the second panel to a temperature higher than 150° C.;
   depositing, after said preheating, a first adhesion layer onto the first peripheral zone of the first panel and a second adhesion layer onto the second peripheral zone of the second panel;
   welding a first metal seal element to the first adhesion layer; and
   welding a second metal seal element or said first metal seal element to the second adhesion layer;
   wherein depositing the first and second adhesion layers comprises a high-velocity oxy-fuel flame-spraying process,
   wherein the process forms a gas-tight seal between at least the first and second glass panels, and
   wherein the gas tight seal is sufficient to maintain a pressure inside the glazing lower than $10^{-3}$ mbar.

2. The process of claim 1, further comprising:
   depositing a metal solder layer onto at least a portion of the first adhesion layer, the second adhesion layer, or both,
   wherein a weld of the first metal seal element, the second metal seal element, or both is a fusion weld of the metal solder layer.

3. The process of claim 1, wherein at least a portion of the welding is ultrasonic or induction welding.

4. The process of claim 1, wherein the glazing is a vacuum glazing.

5. The process of claim 1, comprising welding a second metal seal element to the second adhesion layer,
   wherein the process further comprises welding the first metal seal element to the second metal seal element.

6. The process of claim 1, further comprising:
   exposing the first adhesion layer, the second adhesion layer, or both to a carburising flame before welding to that adhesion layer.

7. The process of claim 1, wherein the first and second adhesion layers each comprise at least one adhesive material selected from the group consisting of copper, copper alloy, aluminum, aluminum alloy, iron, iron alloy, platinum, platinum alloy, titanium, titanium alloy, tin, and tin alloy.

8. The process of claim 1, wherein the first and second adhesion layers each comprise an adhesive material that has a coefficient of thermal expansion of 3 to $23 \times 10^{-6}$ K$^{-1}$.

9. The process of claim 1, further comprising:
   exposing the first adhesion layer, the second adhesion layer, or both to a soldering flux before welding, before depositing a metal solder layer, or before both.

10. The process of claim 1, wherein the first metal seal element, the second metal seal element, or both, comprises a metal weld layer prior to welding to the first or second adhesion layer.

11. The process of claim 1,
   wherein the depositing the first and second adhesion layers is in an atmosphere at atmospheric pressure;
   welding the first metal seal element to the first adhesion layer is in an atmosphere at atmospheric pressure;
   the process comprises welding a second metal seal element distinct from the first metal seal element to the second adhesion layer in an atmosphere at atmospheric pressure; and
   the process further comprises welding the first metal seal element to the second metal seal element in an atmosphere at reduced pressure or under vacuum.

12. The process of claim 1, wherein the first and second metal seal elements each comprise at least one material selected from the group consisting of copper, copper alloy, aluminum, aluminum alloy, iron, and iron alloy.

13. The process of claim 1, wherein the first and second metal seal elements, an adhesive material of the first and second adhesion layers, or both comprise an iron alloy comprising iron in a content of 53-55% wt., nickel in a content of 28-30% wt., and cobalt in a content of 16-18% wt.

14. The process of claim 1,
   wherein the high-velocity oxy-fuel flame-spraying process employs a spraying assembly comprising a first inlet, a second inlet, a third inlet, and an outlet,
   wherein the first, second, and third inlets lead to a combustion chamber,
   and wherein the high-velocity oxy-fuel flame-spraying process comprises:
   injecting, under pressure, a fuel and oxygen through the first inlet;
   injecting an adhesive material into the second inlet;
   combusting the fuel and the oxygen, thereby melting the adhesive material in the combustion chamber;
   injecting a gas under pressure through the third inlet of the spraying assembly, thereby enabling spraying of the molten adhesive material from the assembly via the outlet at a supersonic speed; and
   orienting the outlet of the assembly towards a peripheral zone, thereby enabling formation of an adhesion layer.

15. The process of claim 14, wherein an angle between an axis of the outlet and the glass panel is from 45° to 90°.

16. The process of claim 14,
   wherein the high-velocity oxy-fuel flame-spraying process comprises moving the spraying assembly and the glass panel relative to one another at a speed of from 5 to 30 m/min.

17. The process of claim 1, wherein the first and second peripheral zones of the first and second panels are on a respective edge of the first and second panels.

18. A glazing, obtained by a process comprising the process of claim 1.

19. The process of claim 15, wherein the angle between the axis of the outlet and the glass panel is from 70° to 90°.

20. The process of claim 16, wherein the high-velocity oxy-fuel flame-spraying process comprises moving the spraying assembly and the glass panel relative to one another at a speed of from 5 to 20 m/min.

21. The process of claim 1, wherein the gas tight seal is sufficient to maintain a pressure lower than $10^{-3}$ mbar for 10 years.

22. The process of claim 1, wherein no detectable leaks through the gas tight seal on the glazing unit are measured in accordance with European standard EN13185 after immersing the glazing in a chamber containing more than 99% helium.

* * * * *